(12) United States Patent
Kim

(10) Patent No.: US 9,055,249 B2
(45) Date of Patent: Jun. 9, 2015

(54) CMOS IMAGE SENSOR WITH BUILT IN CORRECTION FOR COLUMN FAILURE

(75) Inventor: Dongsoo Kim, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1015 days.

(21) Appl. No.: 13/093,298

(22) Filed: Apr. 25, 2011

(65) Prior Publication Data

US 2012/0249842 A1  Oct. 4, 2012

Related U.S. Application Data

(60) Provisional application No. 61/468,230, filed on Mar. 28, 2011.

(51) Int. Cl.
*H04N 5/374* (2011.01)
*H04N 5/365* (2011.01)

(52) U.S. Cl.
CPC ........... *H04N 5/3742* (2013.01); *H04N 5/3658* (2013.01)

(58) Field of Classification Search
None
See application file for complete search history.

(56) References Cited

U.S. PATENT DOCUMENTS

| | | | |
|---|---|---|---|
| 6,947,086 B1* | 9/2005 | Rutten et al. | 348/304 |
| 7,091,466 B2 | 8/2006 | Bock | |
| 7,154,075 B2 | 12/2006 | Krymski | |
| 7,402,789 B2 | 7/2008 | Bock | |
| 7,541,568 B2* | 6/2009 | Chou | 250/208.1 |
| 2006/0125940 A1* | 6/2006 | Tinkler et al. | 348/294 |
| 2006/0261255 A1* | 11/2006 | Raynor | 348/302 |
| 2010/0182473 A1* | 7/2010 | Nakamura | 348/308 |
| 2012/0062772 A1* | 3/2012 | Osawa et al. | 348/300 |

* cited by examiner

*Primary Examiner* — Jason Flohre

(57) ABSTRACT

A system for correcting a column line failure in an imager includes a pixel selection circuit configured to receive three adjacent pixel output signals, P(n−1), P(n) and P(n+1), respectively, from three adjacent column lines, $(n-1)^{th}$ column line, $n^{th}$ column line and $(n+1)^{th}$ column line. The $(n-1)^{th}$ column line is disposed left of an $n^{th}$ column line, and the $(n+1)^{th}$ column line is disposed right of the $n^{th}$ column line. A generator for generating a bit pattern is also included for indicating a column line failure in the three adjacent column lines. The pixel selection circuit is configured to provide a pixel output signal from one of the three adjacent column lines, based on the bit pattern.

14 Claims, 12 Drawing Sheets

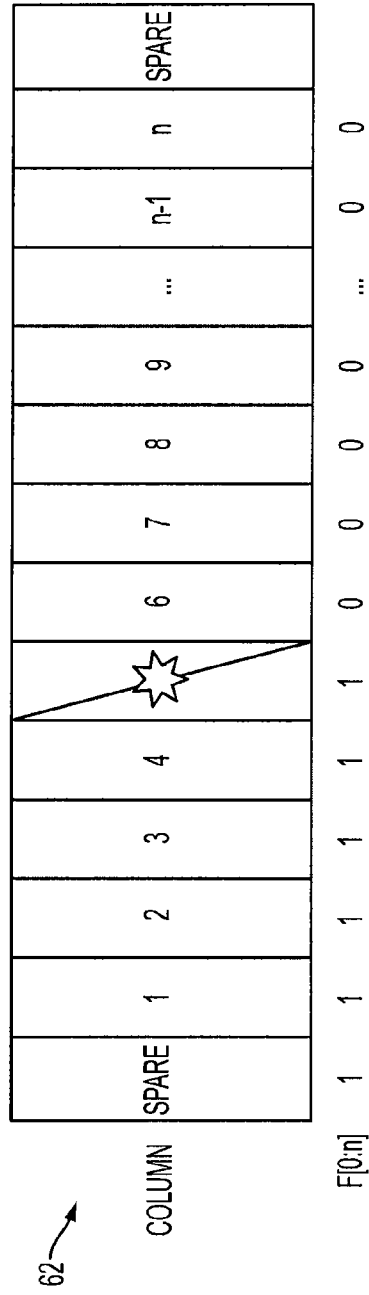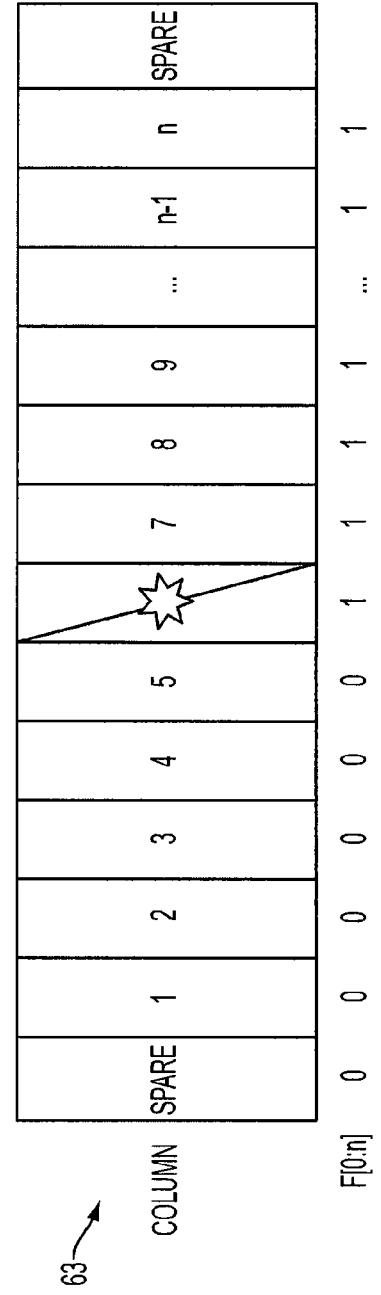

CMOS IMAGE SENSOR WITH BUILT IN CORRECTION FOR COLUMN FAILURE

CROSS REFERENCE TO RELATED APPLICATIONS

This application claims priority of U.S. Provisional Patent Application Ser. No. 61/468,230, filed Mar. 28, 2011, which is incorporated herein by reference.

FIELD OF THE INVENTION

The invention relates generally to CMOS image sensors. More specifically, the present invention relates to built-in corrections for column failures in a CMOS image sensor.

BACKGROUND OF THE INVENTION

FIG. 1 shows an example of a CMOS integrated circuit chip that includes an array of active pixel sensors 30 and a controller 32 that provides timing and control signals to enable reading out signals that are stored in the pixels. Arrays have dimensions of n by m pixels and, in general, the size of array 30 will depend on the particular implementation. The imager is read out a row at a time using a column parallel readout architecture. The controller 32 selects a particular row of pixels in array 30 by controlling the operation of vertical addressing circuit 34 and row drivers 40. Charge signals stored in the selected row of pixels are provided to a readout circuit 42. The pixels of the columns can be read out sequentially using a horizontal addressing circuit 44. Typically, each pixel provides a reset output signal, $V_{out1}$, and a signal representing accumulated charge during an integration period, $V_{out2}$, which are provided at the output of readout circuit 42.

As shown in FIG. 2, array 30 includes multiple columns 49 of CMOS active pixel sensors 50. Each column 49 includes multiple rows of sensors 50. Signals from the active pixel sensors 50 in a particular column can be read out to a readout circuit 52 associated with that column. Signals stored in the readout circuits 52 can be sent to an output stage 54, which is common to the entire array of pixels 30. The analog output signals can then be sent, for example, to an analog-to-digital converter (ADC).

It will be appreciated that the ADC is assumed to be external to the column readout circuits 52. It is also possible for the ADC to be located within the column readout circuits. In the latter case, output signals 70 and 72, in FIG. 2, would be the A/D converted outputs.

Although typically used in CCD sensors, binning techniques are being developed for CMOS active pixel sensors. Summing small neighborhoods of pixels together on a chip into larger "super-pixels" is known as binning and allows the user to trade off imager resolution for other operational parameters. Binning is usually done in square neighborhoods, such as 2×2, which decreases resolution by 2× in both the x and y directions. In some cases, binning may also be done in rectangular neighborhoods, such as 3×5, which sums 15 pixels together resulting in decreased resolution by 3 in the x direction and by 5 in the y direction.

One reason for implementing binning is to capture higher quality images at low-light levels. Since the camera can electronically be switched from full resolution to binning modes, the same camera can be used to provide high resolution images when light levels are adequate, and lower resolution images when light is scarce.

Binning can also be useful for a variety of other reasons. For example, since on-chip binning reduces the number of pixels which must be processed by the sensor's output amplifier, the frame rate of the camera can be increased when operating in a binning mode. This allows the camera to trade-off frame rate for resolution.

Binning is also used occasionally to provide physically large pixels when needed in some optical configurations. In some applications (particularly low light), a camera user may not need extremely high resolution, but may wish to have a pixel size of, for example, 56 microns on each side. Finding a commercially available chip with a 56-micron pixel would be difficult and would require a custom sensor development at a large expense. A simple alternative would be to use a 2K×2K chip with 14-micron pixels. By placing this chip in a 4×4 binning mode, the camera user can obtain an equivalent pixel size of 14×4=56 microns at a resolution of 512×512 using an off-the-shelf chip.

Manufacturing yield in the image sensor market is very important. After chip fabrication of an image sensor, the chip is tested to find failed components. A failure is typically corrected by skipping the failed component, using a redundant component.

A cell failure of an image sensor can be corrected easily by redundant cells. However, the image sensor has difficulty in correcting a column failure, due to the fixed array structure of an imager. Column failures can be corrected by skipping the failed column using a redundant column. This correction is not a good solution, however, because by simply skipping the failed column, features like binning (or summing) become unavailable to the camera user.

The present invention, as will be described, provides built-in correction circuits for column failures, without destroying binning (or summing) modes of operation.

BRIEF DESCRIPTION OF THE DRAWINGS

These and other features and advantages of the invention will be more clearly seen from the following detailed description of the invention which is provided in connection with the accompanying drawings in which:

FIGS. 4A through 4C show an embodiment of the present invention, in which a pattern generator indicates an odd column failure, and an even column failure.

DETAILED DESCRIPTION OF THE INVENTION

The present invention, as will be explained, provides built-in correction for one or more column failures. The built-in correction also supports various binning/summing modes, as will be explained.

Referring first to FIGS. 3A-3D, there is shown a column parallel readout architecture of a CMOS imager, including pixel array 30 and column array 60. The pixel array 30 includes multiple rows of pixels, only one row having n pixels are shown. The column array 60 includes n columns, namely columns 1 through n, which process sequential rows of pixels 1 through n, respectively.

Figure 1:
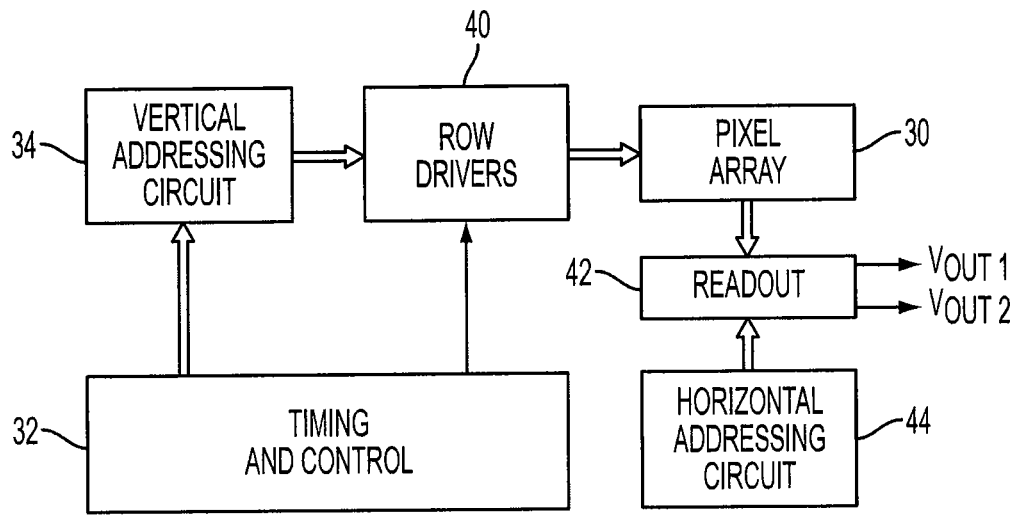
FIG. 1 is a block diagram of a conventional CMOS active pixel sensor chip.
Figure 2:
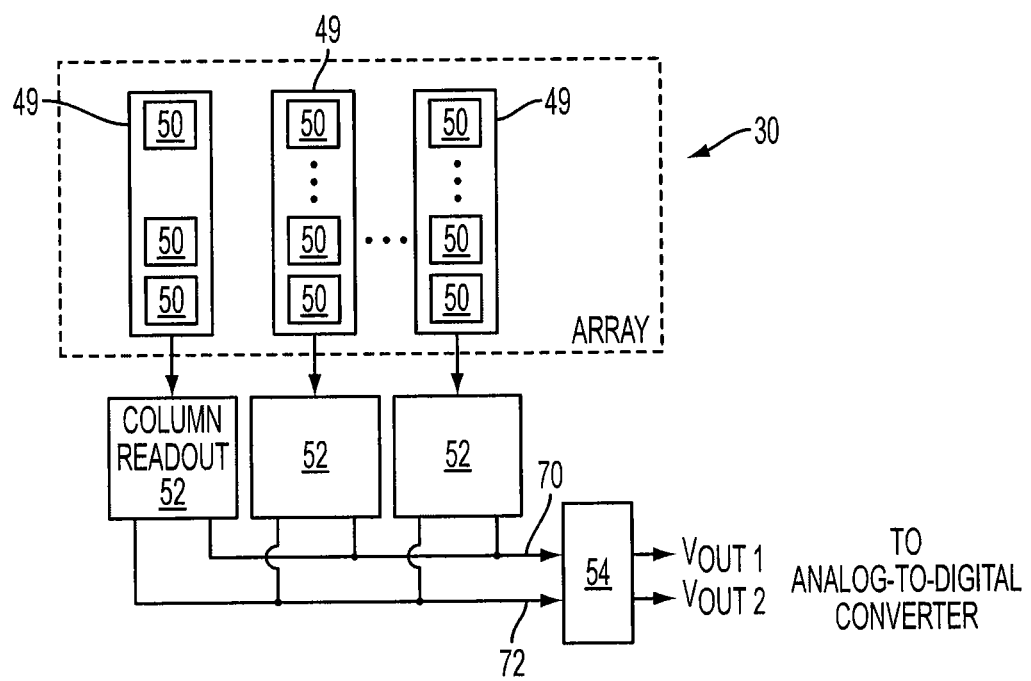
FIG. 2 is block diagram of a conventional array of active pixel sensors and a readout circuit.
Figure 3A:
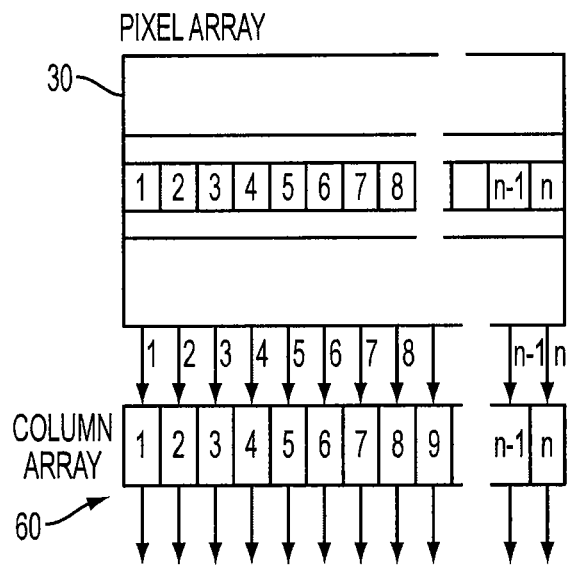
FIG. 3A shows a column parallel readout architecture of a CMOS imager, as an example.

FIG. 3A shows no column failures have been detected and, thus, columns 1 through n, correspondingly, process each row of pixels, the pixels numbered 1 through n.

Figure 3B:
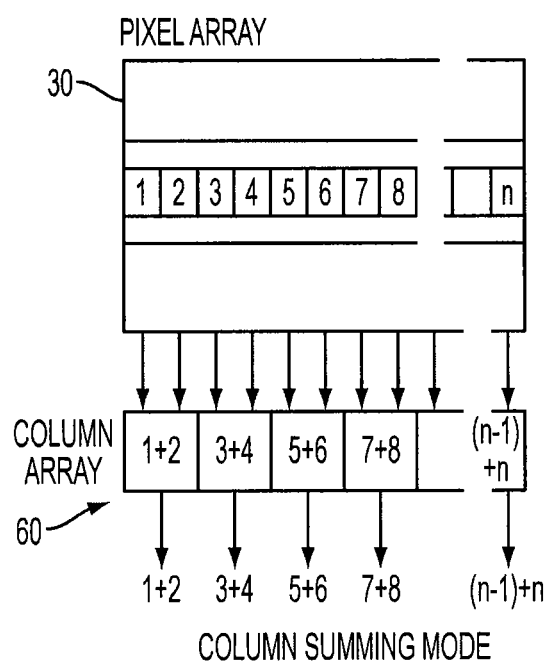
FIG. 3B shows a column summing operation, as an example.

FIG. 3B shows a column summing mode of operation, when no column failures are detected. Thus, as an example, columns 1 and 2 are summed together, columns 3 and 4 are summed together, etc.

Figure 3C:
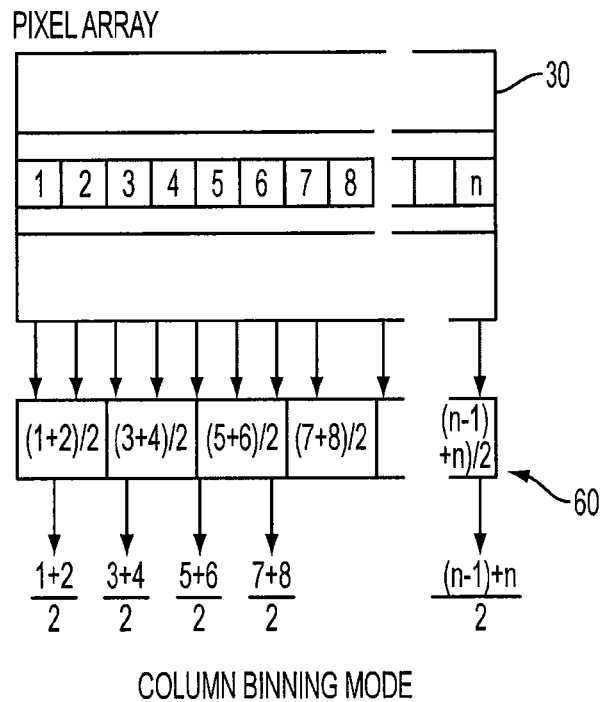
FIG. 3C shows a column binning operation, as an example.

FIG. 3C shows a column binning mode of operation, when no column failures are detected. Thus, as an example, columns 1 and 2 are averaged (pixel intensities are summed and divided by 2), columns 3 and 4 are averaged, etc.

Figure 3D:
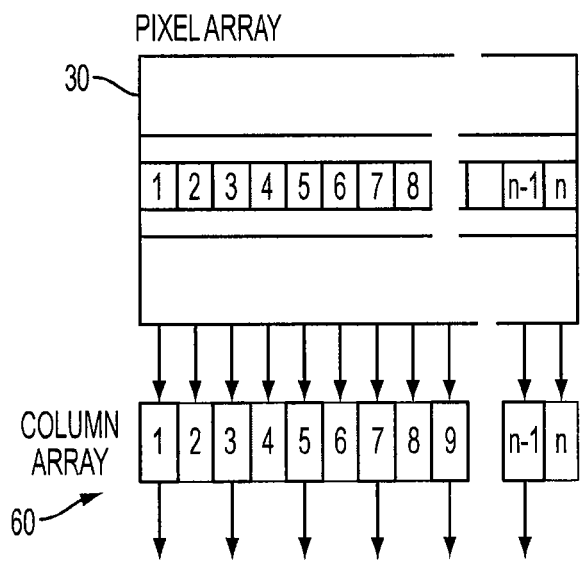
FIG. 3D shows a skip mode of operation, as an example.

FIG. 3D shows a skip mode of operation (every other column is skipped), when no column failures are detected. Thus, column 1 reads pixel 1 in a row, column 3 reads pixel 3 in a row, etc. It will be appreciated that the skip mode of operation may be used in the preview mode of a camera, or in a low power consumption mode of a camera.

Figure 4A:
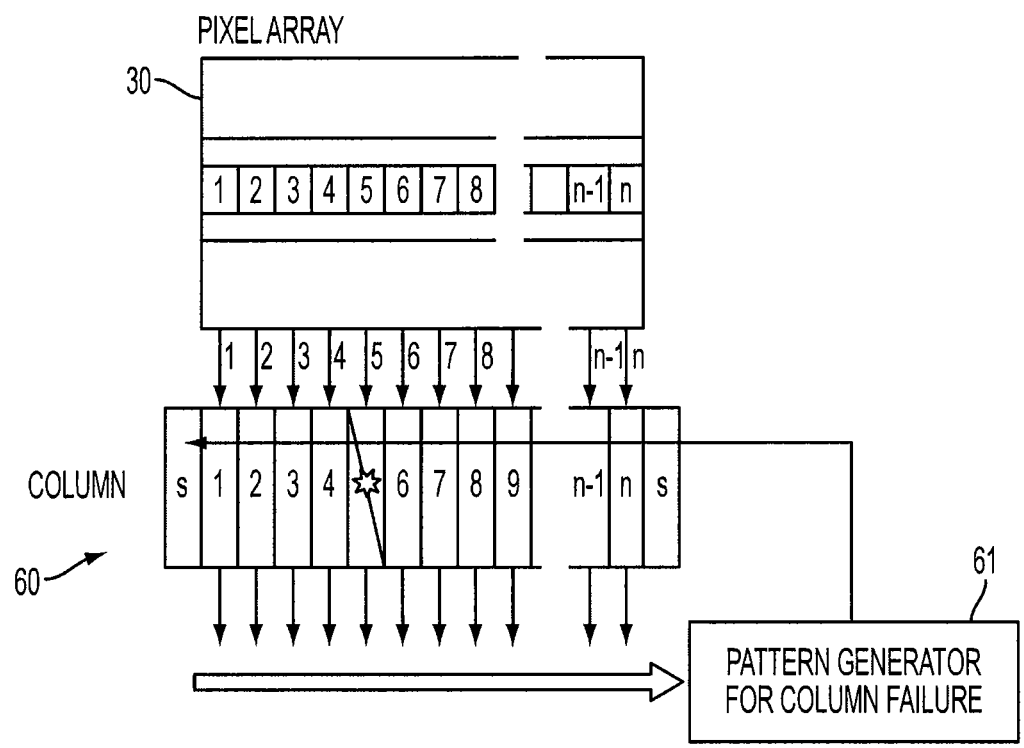

Turning next to FIGS. 4A through 4C, there is shown an embodiment of the present invention. A pattern generator, designated as 61, is used to test each column in column array 60. A column failure pattern, F[0:n], is generated based on the test results. The column failure pattern, F[0:n] is generated differently, based on whether a column failure location is in an odd or an even column. When there is a failure in the odd column, for example, F[0:n] is "1111110000." starting from the spare column (shown as "s"). The last "1" in the pattern indicates the column number that has a failure. When there is a failure in the even column, for example, F[0:n] is "00000011111" starting from the spare column (shown as "s"). The first "1" in the pattern indicates the column number that has a failure.

As an example, FIG. 4B shows a failure in an odd column (column 5) of column array 62. The column failure pattern generated is depicted as:

F[0:n]=1111110000 . . . 00

The last "1" in the pattern above is in the odd column number 5. This indicates that column 5 has a failure.

As another example, FIG. 4C shows a failure in an even column (column 6) of column array 63. The column failure pattern generated is depicted as:

F[0:n]=0000001111 . . . 11

The first "1" in the above pattern is in the even column 6, which indicates that column 6 has a failure.

Figure 5:
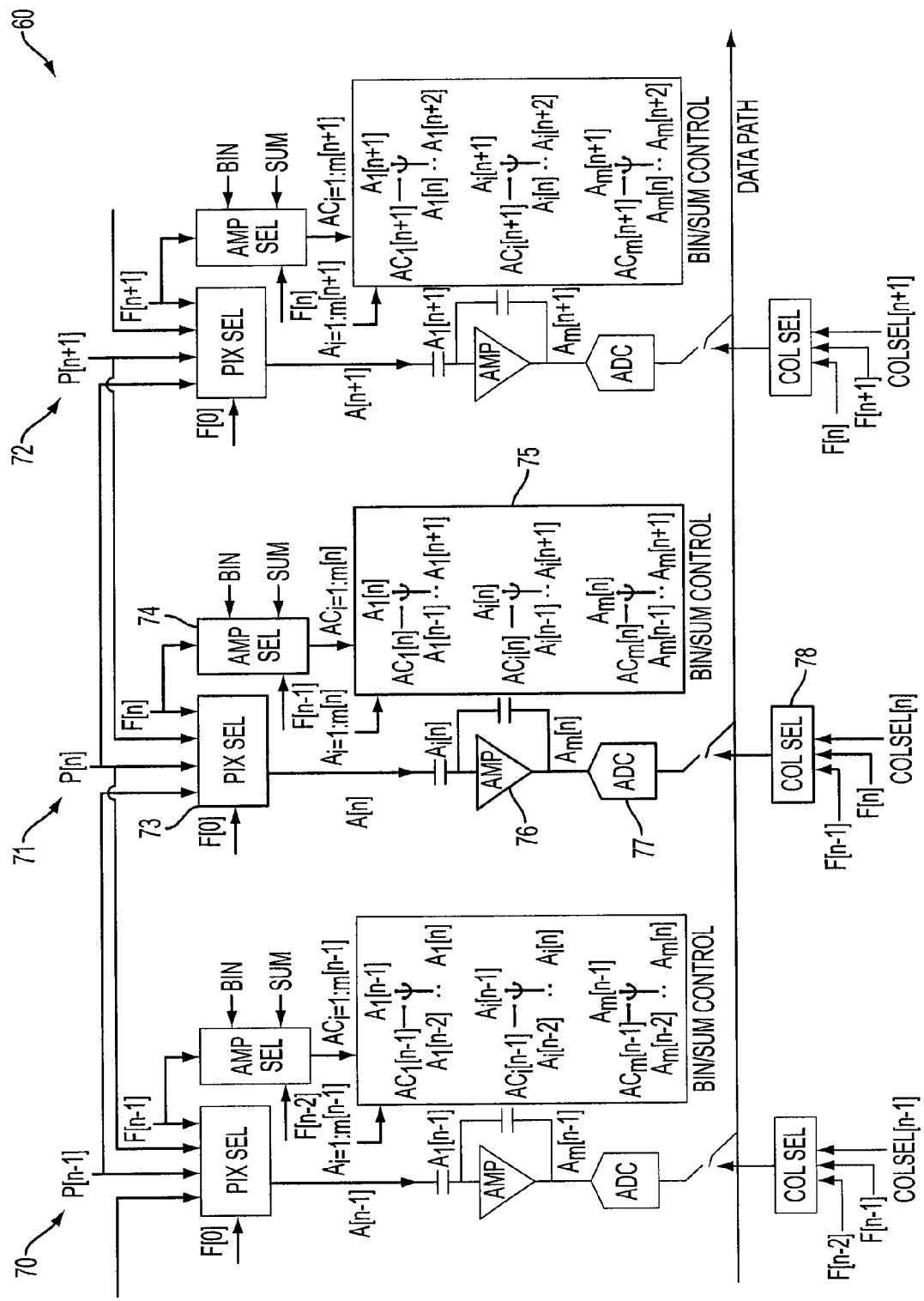
FIG. 5 shows three adjacent columns, which are each similar to each other, and are configured in accordance with an embodiment of the present invention.

Referring now to FIG. 5, there is shown a block diagram of three adjacent columns 70, 71 and 72. The three columns are similar and, thus, only the center column 71 in the "n" column position of column array 60 is described below:

Column 71 includes a pixel selection circuit 73, an amplifier selection circuit 74 and a binning/summing control circuit 75. Also included is amplifier 76, which is serially coupled to ADC 77. A column selector 78 is included to select the column to read out onto the data path. For example, if the colsel(n) command is inputted into column selector 78, the output from ADC 77 of column n is read out onto the data path.

The pixel selection circuit 73 receives three pixel output signals, namely, P(n), P(n−1) and P(n+1). As shown, P(n−1) is a pixel output normally routed to column (n−1), which is left of the n column. The P(n+1) is a pixel output normally routed to column (n+1), which is right of the n column.

Figure 6:
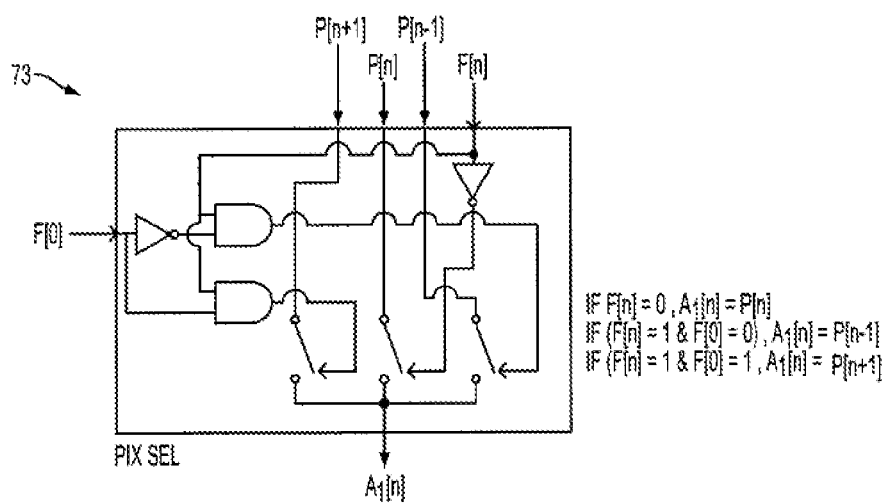
FIG. 6 provides an example of logic gates included in a pixel selection circuit, which is configured in accordance with an embodiment of the present invention.

Depending on the bit pattern generated by pattern generator 61 (FIG. 4A), F(n) and F(0) will each have a bit value of 1 or 0. The F(n) represents the bit value for the n column and F(0) represents the bit value for the 0 column (the spare column is the 0 column). Therefore, according to an embodiment of the present invention, as shown in FIG. 6, pixel selection circuit 73 provides one of the three pixel output signals as the output signal A(n). The signal A(n) is also the input signal to column amplifier 76 shown in FIG. 5.

According to an example of the logic gates included in pixel selection circuit 73 (FIG. 6), and the bit values of F(n) and F(0), the output signal, A(n), is determined as follows:

If F[n]=0, then $A_1[n]=P[n]$;
If (F[n]=1 and F[0]=0), then $A_1[n]=P[n-1]$.
If (F[n]=1 and F[0]=1), then $A_1[n]=P[n+1]$.

The output bits $A_{i=1:m}[n]$, shown in FIG. 5, are control nodes for the column amplifier used for the binning or summing mode; these are similar to the virtual grounds of an op-amp. The number of the nodes can be changed by binning or summing control methods. The colsel[n] is the column control signal to select the column to read out.

The built-in correction circuit reconfigures the connections between the columns to support horizontal (column-wise) signal summing/binning. The column skip modes are skip 2 and skip 4, for example. Skip 2 generates the pixel signals every two columns, resulting in half resolution in the column; skip 4 generates the pixel signals every four columns, resulting in quarter resolution in the column.

It will be appreciated that the ADC can be located outside of the column array. In such case, the column is enabled by the column selection circuit without the ADC.

The pixel selection circuit is configured to select one input signal from three input signals. This prevents an input signal from going to a failed column. The amplifier selection circuit 74 generates the control signal, $AC_{i=1:m}$, in order to control the binning/summing block 75. The binning/summing modes are supported by reconfiguring connections of the column amplifiers. The binning/summing block 75 includes multiple switches used for the connections between the column amplifier located on the right side, or the left side of the n column. The column selector 78 has additional functions to support a skip mode considering the column failure location. No signal difference in the output data path is necessary.

The amplifier selection circuit 74 generates control signals ($AC_i$) for the binning/summing mode as follows:

If n is even, then the column amplifier has no connection control (connections are decided by the odd column).
If n is odd and F[n]−0, then the column amplifier has connections with the right-side column amplifier for binning/summing mode.
If n is odd and F[n]=1 and F[n−1]=1, then the column amplifier has connections with the left-side column amplifier for binning/summing mode.

If n is odd and F[n]=1 and F[n−1]=0, then the column amplifier has no connections with the left-side column amplifier for binning/summing mode. The column amplifier is in a failed column.

Figure 7A:
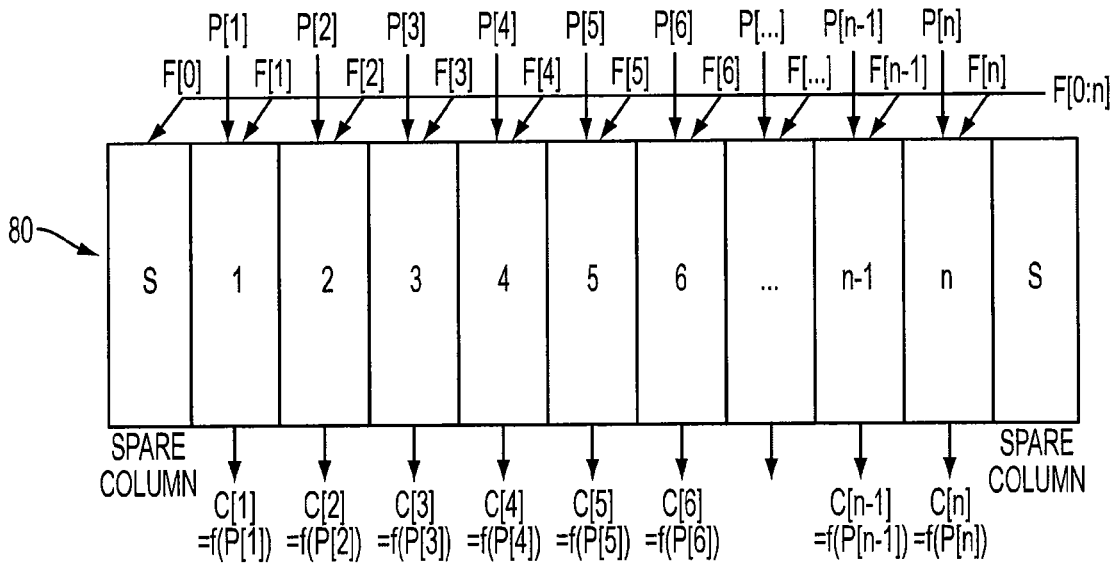
FIGS. 7A through 7C show three examples of column configurations, which are configured in accordance with a embodiment of the present invention.
Figure 7B:
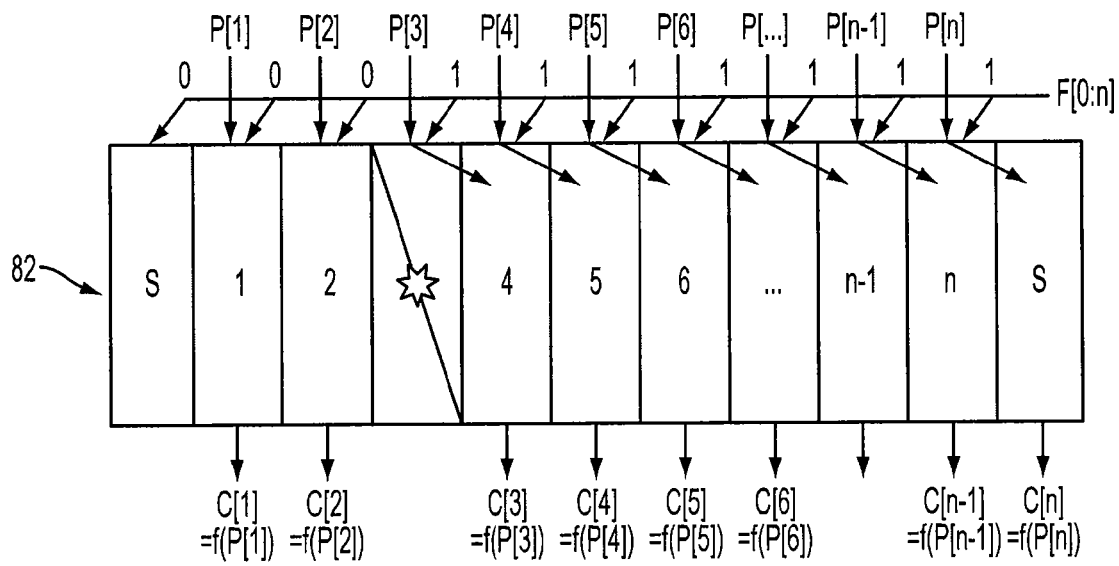
Figure 7C:
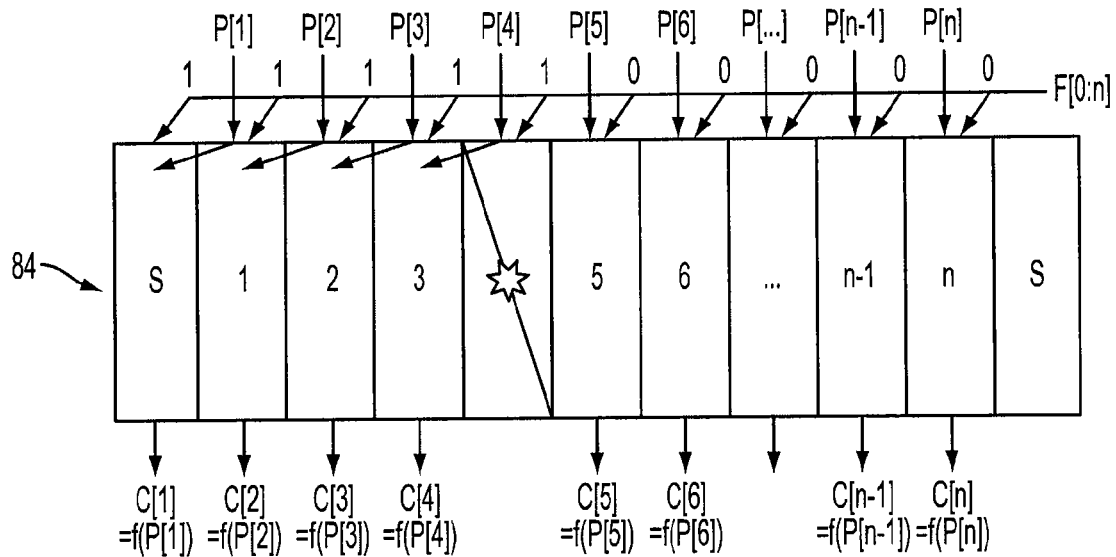

Referring now to FIGS. 7A-7C, three different configurations of built-in corrections, which are implemented by the present invention, are shown.

In all three configurations the binning/summing control is OFF. Configuration 80 is a normal operation in the columns without any detected failures. Two spare columns are shown, referred to as "s", disposed on the left side and right side of the column array (columns numbered 1 through n). If there is no failed column, the F[0:n]=0, then the pixel output, P[n], is applied to column n, and the output of the column is C(n)=f(P[n]). The function, f( ) can indicate the amplification and A/D conversion in the column.

When there is a column failure ($3^{rd}$ column, odd column), as shown by configuration 82 in FIG. 7B, the pixel outputs from the $1^{st}$ and $2^{nd}$ positions are connected to the $1^{st}$ and $2^{nd}$ columns, but the $3^{rd}$ pixel output is connected to the $4^{th}$ column by the pixel selection circuit. The following pixel outputs are also connected to the right-side column to avoid a connection with the failed column.

When there is a column failure ($4^{th}$ column, even column), as shown by configuration 84 in FIG. 7C, the pixel outputs from the $5^{th}$ to $n^{th}$ positions are connected to the $5^{th}$ to $n^{th}$ columns, but the $4^{th}$ pixel output is connected to the $3^{rd}$ column by the pixel selection circuit. The previous pixel outputs are also connected to the left-side column to avoid a connection with the failed column.

Figure 8A:
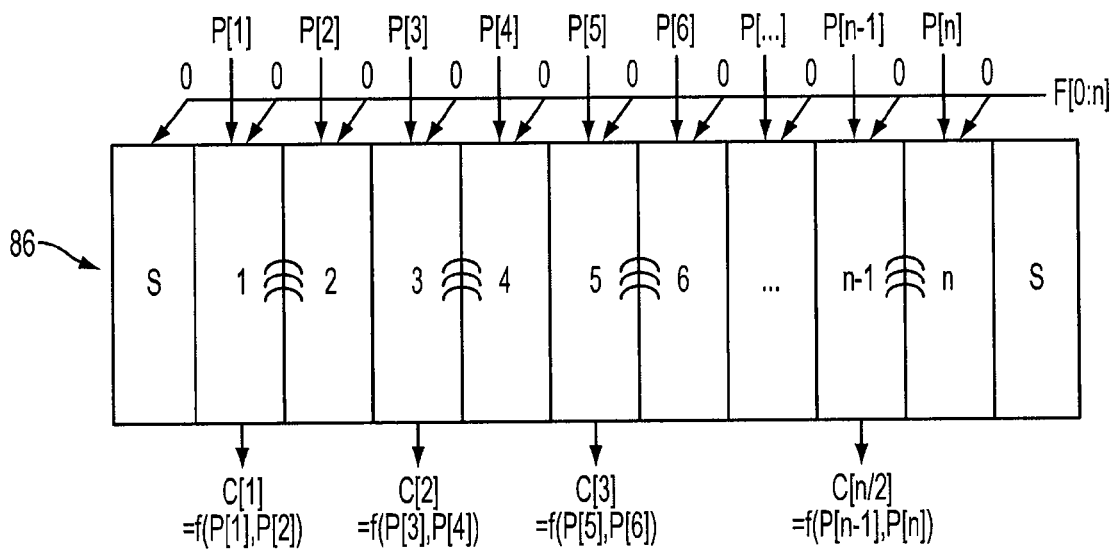
FIGS. 8A through 8C show three examples of binning/summing operations, which are configured in accordance with an embodiment the present invention.
Figure 8B:
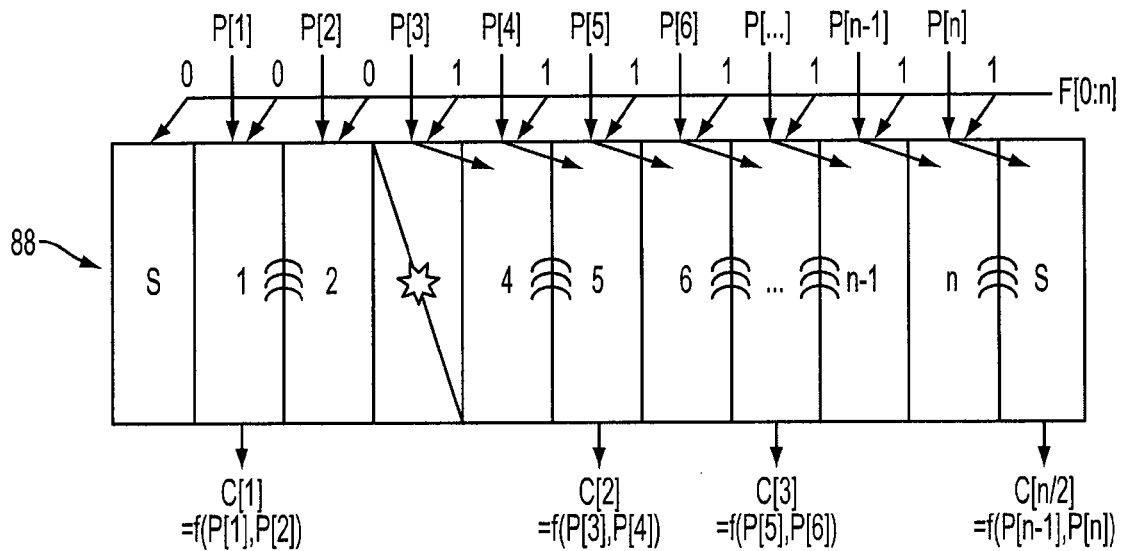
Figure 8C:
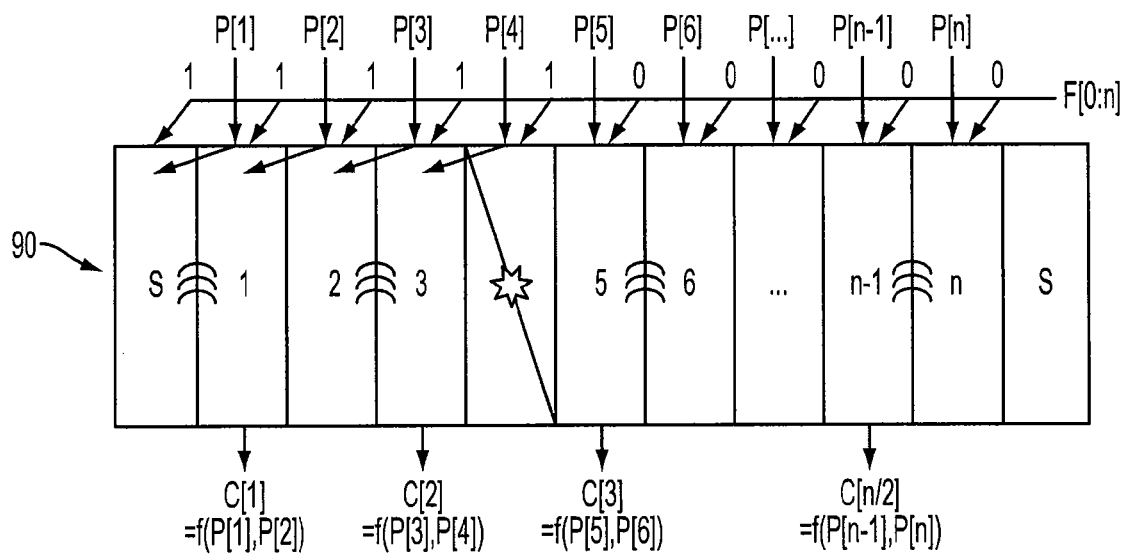

Referring now to FIGS. 8A-8C, there are shown three different configurations of a built-in correction operation implemented by the present invention.

In all three configurations the binning/summing control is ON. Configuration 86 is a normal operation in the columns without any detected failures. There are two spare columns, s, on the left side and right side of the column array (columns 1 through n). If there is no failed column, F[0:n]=0, then the pixel output, P[n], is applied to column n, and the output of the column is C(n)=f(P[n]). Because of the binning/summing mode, the odd column has connections to the right-side, even column. The function, f( ) can indicate amplification and A/D conversion for P[n−1] and P[n].

When there is a column failure ($3^{rd}$ column, odd column), as shown by configuration 88, the built-in column correction reconfigures the connections. Since there is a column failure in the odd column, the connections for all left-side columns of the failed column are not changed. However, the connection for all right-side columns of the failed column have different connections including the right spare column, s.

When there is a column failure ($4^{th}$ column, even), as shown by configuration 90, the built-in column correction reconfigures the connections. Since there is a column failure in the even column, the connections for all right-side columns of the failed column are not changed. However, the connection for all left-side columns of the failed column have a different connection including the left spare column, s.

Figure 9A:
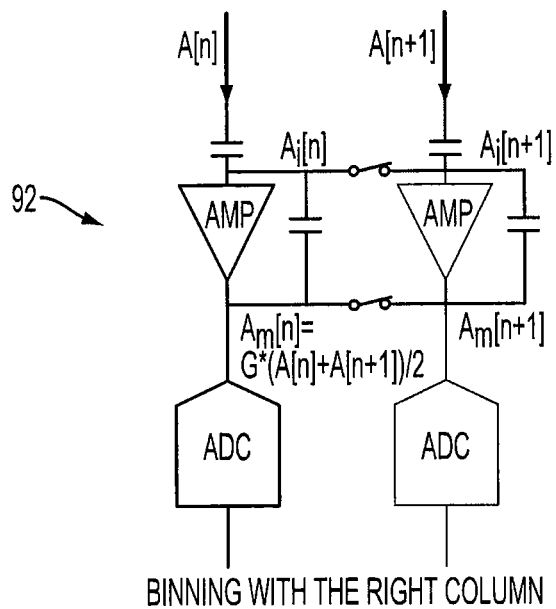
FIG. 9A shows an example of a binning operation with the right column.
Figure 9B:
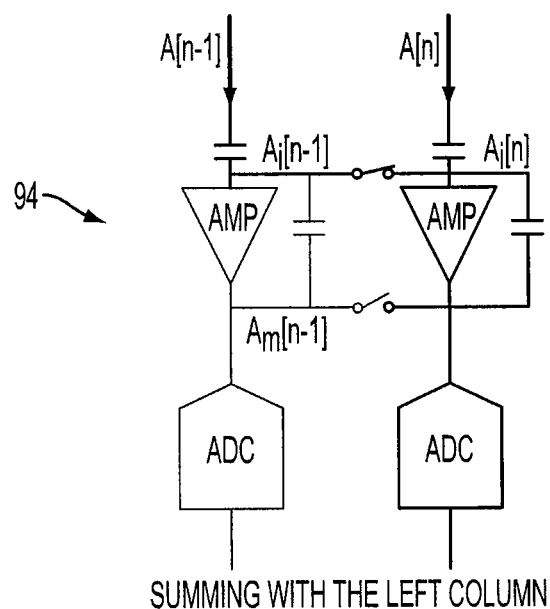
FIG. 9B shows an example of a summing operation with the left column.

Referring next to FIGS. 9A and 9B, there are shown examples of binning and summing, respectively. The n is the $n^{th}$ column; also n is an odd column. Since the odd column decides the connection for the binning/summing mode, A[n] is the input of the column amplifier, and G is the gain of the column amplifier.

FIG. 9A shows a binning mode 92 with the right column. The column amplifier has an output of $G*(A[n]+A[n])/2$. FIG. 9B shows a summing mode 94 with the left column. The column amplifier has an output of $G*(A[n]+A[n-1])$.

It will be appreciated that in the examples of binning/summing configurations, the odd column has connections to the right-side or left-side, but it is also possible for the even column to have connections, in reverse, The present invention can also correct column failures up to two columns, in the even or odd columns [each R(B) and Gr(GB) column].

Figure 9C:
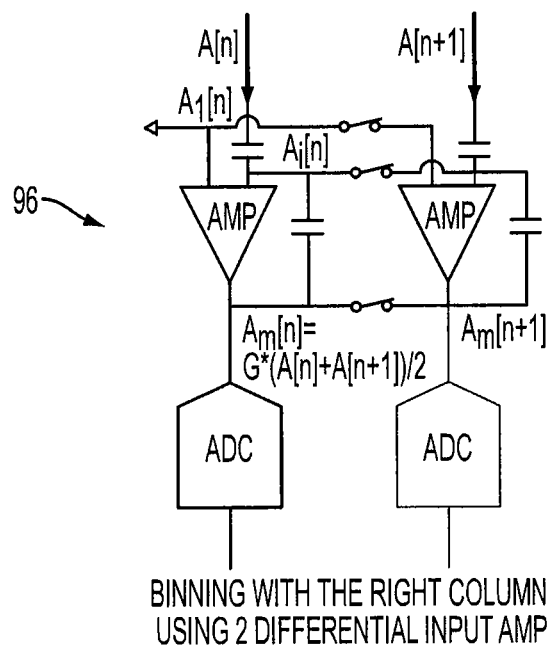
FIG. 9C shows an example of a binning operation with the right column, using two differential input amplifiers.

In the binning modes shown in FIGS. 9A and 9B, only one column amplifier is turned ON. However, the binning mode may have both amplifiers turned on. Such an example is shown in FIG. 9C as configuration 96.

Although the invention is illustrated and described herein with reference to specific embodiments, the invention is not intended to be limited to the details shown. Rather, various modifications may be made in the details within the scope and range of equivalents of the claims and without departing from the invention. For example, the built-in column correction can be applied to column readout circuits which are located at the top and bottom of the pixel array and can then correct the column failures independently of each other. As another example, the built-in column correction can be applied to column readout circuits which can separately correct each color plane (green and red/blue). As an example, the column correction can correct the column failures in green and red (blue) separately.

What is claimed:

1. A system for correcting a column line failure in an imager comprising:
   an array of CMOS active pixels arranged in rows and columns, wherein the array of CMOS active pixels captures color images;
   a pixel selection circuit that receives three adjacent pixel output signals, P(n−1), P(n) and P(n+1), respectively, from three adjacent column lines, (n−1)th column line, nth column line and (n+1)th column line,
   the (n−1)th column line disposed left of an nth column line, and the (n+1)th column line disposed right of the nth column line, and
   a pattern generator that generates a bit pattern denoting a column line failure in the three adjacent column lines based on whether the column line failure occurs in an even column or an odd column,
   wherein the pixel selection circuit outputs a pixel output signal from one of the three adjacent column lines, based on the bit pattern and a bit value of a first column line,
   wherein the pixel selection circuit shifts the pixel output signal to the left when the column line failure occurs in an even column and shifts the pixel output signal to the right when the column line failure occurs in an odd column.

2. The system of claim 1 wherein
   when the pattern generator provides a bit pattern of 0 for the nth column line, then the pixel selection circuit is configured to provide a pixel output signal from the nth column line.

3. An averaging/summing system for an imager with built-in column correction comprising:
   an array of CMOS active pixels arranged in rows and columns, wherein the array of CMOS active pixels captures color images;
   a pixel selection circuit that receives three adjacent pixel output signals, P(n−1), P(n) and P(n+1), respectively, from three adjacent column lines, (n−1)th column line, nth column line and (n+1)th column line,
   the (n−1)th column line disposed left of an nth column line, and the (n+1)th column line disposed right of the nth column line, a pattern generator that generates a bit pattern denoting a column line failure in a column line of the imager, wherein each respective column line is assigned a bit value of 1 or 0 in the bit pattern, and an amplifier selection circuit that receives an averaging/summing command and the bit pattern, wherein when the averaging/summing command is asserted, the amplifier selection circuit connects an amplifier in one column line with another amplifier in an adjacent column line, based on the bit pattern, wherein when the averaging/summing command is asserted at a first value the amplifiers are connected in a first configuration to average signals on their respective column lines, and wherein when the averaging/summing command is asserted at a second value the amplifiers are connected in a second configuration to sum signals on their respective column lines; and wherein when the bit pattern generator provides a first bit pattern, pixels from the (n−1)th column line and the nth column line are averaged/summed, and wherein when the bit pattern generator provides a second bit pattern, pixels from the nth column line and the (n+1)th column line are averaged/summed.

4. The averaging/summing system of claim 3 wherein the amplifier selection circuit is configured to connect an amplifier in the nth column with another amplifier in the (n−1)th column line, when the bit pattern includes a value of 1 for the nth column line and a value of 1 for the (n−1)th column line.

5. The averaging/summing system of claim 4 wherein n is an odd numbered column.

6. The averaging/summing system of claim 3 wherein the amplifier selection circuit is configured to connect an amplifier in the nth column with another amplifier in the (n+1)th column line, when the bit pattern includes a value of 0 for the nth column line and n is an odd numbered column.

7. The averaging/summing system of claim 3 wherein the amplifier selection circuit is configured to not connect an amplifier in the nth column with another amplifier in the (n−1)th column line or the (n+1)th column line, when the bit pattern includes a value of 1 for the nth column line and a value of 0 for the (n−1)th column line.

8. A method for correcting a column line failure in an imager having an array of CMOS active pixels arranged in rows and columns, wherein the method comprises:

with the array of CMOS active pixels, capturing a color image;

with a pixel selection circuit, receiving three adjacent pixel output signals, P(n−1), P(n) and P(n+1), respectively, from three adjacent column lines, (n−1)th column line, nth column line and (n+1)th column line, in which the (n−1)th column line is disposed left of an nth column line, and the (n+1)th column line is disposed right of the nth column line;

with a pattern generator, generating a bit pattern denoting a column line failure in the three adjacent column lines based on whether the column line failure occurs in an even column or an odd column; and outputting a pixel output signal from one of the three adjacent column lines, based on the bit pattern and a bit value of a first column line, wherein the pixel selection circuit shifts the pixel output signal to the left when the column line failure occurs in an even column and shifts the pixel output signal to the right when the column line failure occurs in an odd column.

9. The method of claim 8 wherein the outputting step includes:

when the pattern generator provides a bit pattern of 0 for the (n−1)th column line and 1 for the nth column line, then providing a pixel output signal from the (n+1)th column line.

10. The method of claim 9 including the step of:

connecting successive pixel output signals, disposed to the right of the nth column line, to successive column lines disposed to the right of the (n+1)th column line, respectively.

11. The method of claim 8 wherein the outputting step includes:

when the pattern generator provides a bit pattern of 1 for the (n−1)th column line and 1 for the nth column line, then providing a pixel output signal from the (n−1)th column line.

12. The method of claim 11 including the step of:

connecting successive pixel output signals, disposed to the left of the nth column line, to successive column lines disposed to the left of the (n−1)th column line, respectively.

13. The method of claim 8 wherein the outputting step includes:

when the pattern generator provides a bit pattern of 0 for the nth column line, then providing a pixel output signal from the nth column line.

14. The method of claim 8 including the steps of:

receiving an averaging/summing command, and when the averaging/summing command is active, connecting an amplifier in one column line with another amplifier in an adjacent column line, based on the bit pattern.

* * * * *